United States Patent [19]
Agouri et al.

[11] 3,949,017
[45] Apr. 6, 1976

[54] PROCESS FOR GRAFTING OF PLASTICS MATERIALS

[75] Inventors: Elias Agouri; Philippe Mornet, both of Pau; Claude Parlant, Arthez-de-Bearn; Jacques Rideau, Pau, all of France

[73] Assignee: Societe Nationale des Petroles d'Aquitaine, Courbevoie, France

[22] Filed: Nov. 19, 1973

[21] Appl. No.: 417,383

Related U.S. Application Data

[63] Continuation of Ser. No. 215,423, Jan. 4, 1972, abandoned, which is a continuation of Ser. No. 885,368, Dec. 12, 1969, abandoned.

[52] U.S. Cl............... 260/878 R; 260/879; 260/886
[51] Int. Cl.$^2$........... C08F 255/02; C08F 255/06; C08F 257/00; C08F 279/00
[58] Field of Search................. 260/878 R, 879, 886

[56] References Cited
UNITED STATES PATENTS
3,432,577  3/1969  Serniuk.......................... 260/878 R

OTHER PUBLICATIONS

Reich, L. and Schindler, R., Polymerization By Organometallic Compounds, Interscience, New York, (1966), pp. 447–456.

Primary Examiner—Alan Holler
Attorney, Agent, or Firm—Norman S. Blodgett; Gerry A. Blodgett

[57]  ABSTRACT

The present invention relates to a new manner of grafting various organic groups or polymers; it is concerned particularly with the grafting of vinyl, acryl, vinylidene or other chains on polymers of olefines, di-olefines, aromatic vinyl compounds and similar compounds; a new catalytic system is used for effecting such a grafting, wherein a deactivated polymer is brought into contact with at least one organometallic compound and at least one generator of free radicals out of the presence of air.

12 Claims, No Drawings

NEW PROCESS FOR GRAFTING OF PLASTICS MATERIALS

This application is a continuation of Ser. No. 215,423, filed Jan. 4, 1972, now abandoned, which in turn is a continuation of Ser. No. 885,368, filed Dec. 12, 1969, now abandoned.

BACKGROUND OF THE INVENTION

The conventional methods of grafting polymerizable monomers to various polymeric substrata (for example, polyolefines) generally use an activation phase of the substratum followed by a grafting phase of the polymerizable monomer on the active sites created on the substratum during the activation of the substratum can be effected in various ways, for example, by irradiation, by the action of ozones or peroxides, etc.; the monomer to be grafted is brought into contact with the activated substratum at relatively high temperature, i.e., in the order of 60° to 80°C.

U.S. Pat. No. 3,141,862 describes the grafting of polar monomers on olefine polymers by activating the polymers at ambient temperature by a system which comprises a boron trialkyl and oxygen. Afterward, the activated polymers are brought into contact with the monomers to be grafted at temperatures in the region of 60 to 100°C. In addition to the difficulties to which the carrying out of the activation phase may lead, the use during the grafting phase of such high temperatures usually leads to a degradation of the substratum and to a lowering of the molecular weight and the regularity of the grafts. These and other difficulties experienced with the prior art processes have been obviated in a novel manner by the present invention.

It is, therefore, an outstanding object of the invention to provide a process for obtaining a useful plastic consisting of monomers grafted onto polymers.

Another object of this invention is the provision of a process for grafting monomers to polymers with degradation of the polymers.

A further object of the present invention is the provision of a method which effects in a single step the grafting of polymerizable monomers by a radical procedure on a variety of substrata, particularly polyolefines, wherein the operation takes place at low or moderate temperatures, without previous activation of the substratum.

With the foregoing and other objects in view, which will appear as the description proceeds, the invention resides in the combination and arrangement of steps and the details of the composition hereafter described and claimed, it being understood that changes in the precise embodiment of the invention herein disclosed may be made within the scope of what is claimed without departing from the spirit of the invention.

SUMMARY OF THE INVENTION

In general, the invention consists of mixing a deactivated polymer with a small proportion of at least one organometallic compound and a catalyst which generates free radicals, and with a monomer which can be polymerized by free radicals, whereafter the mixture thus formed is kept in the absence of air until a copolymer is obtained from the polymer and monomer which are used.

DESCRIPTION OF THE PREFERRED EMBODIMENT

A wide variety of polymers can be subjected to the treatment according to the invention, especially polyolefines (such as high-pressure polyethylenes, low-pressure polyethylenes, polypropylenes, and polybutenes), halogenated polyolefines (such as the chlorinated polyethylenes, and chlorinated butyl), polydiolefines (such as polybutadiene and polyisoprene), copolymers of several olefines, of several diolefines or of olefines with diolefines (such as polyethylene-polypropylene-butadiene), and copolymers of olefines with polar monomers (such as ethylenevinylacetate copolymers). Other polymers capable of use are of the vinyl or acryl type, particularly of the polystyrene type. It is thus possible to treat different polymers derived from compounds such as styrene, $\alpha$-methyl styrene, chlorostyrenes, vinyl pyridine, methyl vinyl pyridine, methyl formaldehyde, and acrylate or methacrylate of methyl or other alkyls.

The polymer to be treated is preferably brought before-hand into either suspension or solution in an appropriate medium which may, depending on the circumstances, be a halogenated aliphatic or aromatic hydrocarbon. For example, the polyolefines can with advantage be suspended in a medium such as hexane or heptane.

It is obvious that other media can be used without departing from the scope of the present invention; the suspension medium could, for example, be in the form of the actual monomer to be grafted.

As a monomer capable of being grafted on to the polymers by the process, it is possible to employ vinyl, vinylidene, acryl, methacryl, and similar compounds, especially vinyl acetate, vinyl chloride, vinylidene chloride, methyl, ethyl and butyl acrylates or methacrylates, sodium and zinc acrylates or methacrylates, acrylonitrile or methacrylonitrile, styrene or its derivatives, cinyl pyridine, vinyl carbazole, and the like.

The organometallic compound or compounds serving as the catalyst generally comprise the various compounds in which at least one carbon atom of an organic group is bonded to the metal atom. Especially suitable for this purpose are the organometallic compounds of the metals whose atomic numbers are in the range of from 3 to 56, especially those compounds of metals such as Li, Mg, Al, Zn, Cd, Cr, Ni, and Co. The compounds whose use is most practical are the alkylated derivatives of which the alkyl contains 1 to 6 carbon atoms, as well as certain arylated derivatives. Haloalkyls are also suitable. Excellent results are obtained with dimethyl-zinc, diethyl-zinc, dipropyl-zinc, dibutyl-zinc, and diphenyl-zinc, or the corresponding compounds of cadmium.

The proportions of the organometallic compounds to be added to the polymers can vary within fairly wide limits, depending on the nature of the organometallic compound, the nature of the polymer and the temperature. However, the best proportion is between 1 and 30 and, particularly, between 1 and 15 millimoles per mole of the monomer of the polymer being used.

Among the catalysts which generate free radicals and are capable of being used in the process are oxygen, air, and different organic per-compounds, especially hydroperoxides, peroxides, peracids, esters of peracids, and similar substances. Peroxy compounds such as cumene, paramenthane and tert.-butyl hydroperoxides, tert.-butyl peracetate, benzoyl, lauroyl, acetyl, dichloro-2, 4-benzoyl peroxides, methyl ethyl ketone, etc. are suitable.

In certain cases, the catalyst which generates free radicals can be formed by an association of an organo-zinc or an organo-cadmium with a quinone or a phenol. The diethyl cadmium-parabenzoquinone, diethyl zinc-parabenzoquinone, and diethyl zinc-hydroquinone systems can be mentioned as examples.

In the same way as in the case of the organometallic compounds, the proportion of the catalyst generating free radicals is capable of varying between substantially the same limits. The ratio between the quantity of radical catalysts and that of organometallic compounds is of importance; this ratio can vary within the range from 0.5 to 4 equivalents of metal per unit of catalyst capable of forming a free radical. The preferred proportion corresponds to one equivalent of metal to one equivalent of catalyst capable of producing a free radical.

Although grafting of plastics in accordance with the invention can be carried out between −80° and +60°C., the preferred temperature range is from −20° to +40°C. In all cases, it is preferable that the reaction medium be suitably agitated. The invention is illustrated in non-limiting manner by the examples which follow:

EXAMPLE I

The polymer to be grafted was a high density polyethylene with a viscometric molecular weight of 240,000. 40 g (i.e., 1.42 moles of $C_2H_4$) of this polyethylene were dispersed in 500 ml of heptane. To the suspension obtained were added 12 millimoles of diethyl zinc, $Zn(C_2H_5)_2$, and 12 millimoles of cumene hydroperoxide, which is referred to by the abbreviation "HPC" in the remainder of the specification; this introduction took place under a nitrogen atmosphere.

The solution then had added thereto 40 g of methyl methacrylate and the whole was maintained at 40°C., while stirring, for 4 hours. The polymer was then separated from the suspension in known manner. By infra-red spectral analysis, it was found that the copolymer obtained contained 9.2% of methyl methacrylate fixed to the polyethylene.

The product obtained had a melting point of 133°C. as compared with 137°C. for the initial polyethylene. Its intrinsic viscosity was 3.31 in tetraline at 135°C., while that of the initial polyethylene was 3.81. The process was also carried out in a manner similar in all respects to the above, except that there was no organometallic compound in the reaction medium, and the final product was found to contain only 0.1% of methyl methacrylate, and its physical properties remained very close to those of the polyethylene being used.

EXAMPLE 2

A grafting process in accordance with the operating procedure of Example 1 was carried out on 19.8 g of polyethylene already grafted beforehand with 5.3% of methyl methacrylate. After heating with 12 millimoles of HPC, 12 millimoles of diethyl zinc, and 20 g of methyl methacrylate at 50°C. for 2 hours, a polymer was obtained which contained 15% of methyl methacrylate fixed to the polyethylene chains.

EXAMPLE 3

To 25 g of the same polymer as in Example 1, dispersed in 300 ml of heptane, were added 6 millimoles of diethyl zinc, 6 millimoles of HPC, and 25 g of dimethylamino-ethyl methacrylate. The whole was agitated for 6 hours at 40°C. The copolymer obtained contained 4.4% of dimethylamino-ethyl methacrylate fixed to the polyethylene chains.

EXAMPLE 4

To 20 g of the same polyethylene as before, dispersed in 300 ml of heptane, were added the same quantities of catalysts as in Example 3 and 25 g of vinyl acetate. After 6½ hours at 40°C. the product obtained contained 0.6% of vinyl acetate.

EXAMPLE 5

25 g of the same polyethylene as above were dispersed in 500 ml of heptane; 12 millimoles of $ZnEt_2$, 6 millimoles of paramenthane hydroperoxide, and 70 g of vinyl chloride were added. After 4 hours at 40°C. the copolymer obtained contained 1% of vinyl chloride.

EXAMPLE 6

10 g of high-pressure polyethylene were dispersed in 100 ml of n-heptane; the dispersion had added thereto 4 millimoles of diethyl zinc, 2 millimoles of cumene hydroperoxide, and 4 g of acrylonitrile. After 16 hours at 20°C. the copolymer obtained contained 20% of acrylonitrile fixed to the polyethylene chains.

EXAMPLE 7

Example 6 was repeated, but the high-pressure polyethylene was replaced with low-pressure polyethylene, having a viscometric molecular weight of 65,000. The grafted copolymer obtained contained 7% of acrylonitrile.

EXAMPLE 8

Example 6 was repeated, replacing the high-pressure polyethylene with the same quantity of polypropylene, having a viscometric molecular weight of 178,000. The product obtained included 8% of acrylontrile fixed to the polypropylene chains.

EXAMPLE 9

10 g of polypropylene of Example 8 were dispersed in 300 ml of n-heptane. To the dispersion which was obtained were added 3 millimoles of diethyl zinc, 3 millimoles of cumene hydroperoxide, and 10 g of dimethylamino ethyl methacrylate.

EXAMPLE 10

Example 6 was repeated, carrying out the grafting reaction at 0°C. for 8 hours. The copolymer obtained contained 5% by weight of acrylonitrile fixed to the polyethylene chains.

EXAMPLE 11

40 g of a high density polyethylene with an intrinsic viscosity equal to 4.0 were dispersed in 500 ml of heptane. To the suspension which was obtained were added 12 millimoles of diethyl zinc, 40.6 g of methyl methacrylate, and 6 millimoles of a solution of para-benzoquinone in benzene under a nitrogen atmosphere. The suspension is then heated to 50°C. while stirring for 6 hours. The product obtained was washed with methanol to which HCl was added and then subjected first to an extraction with acetone and then an extraction with chloroform. The insoluble portion was then dried and analyzed. It contained 15.8% by weight of polymethyl methacrylate fixed to the polyethylene, and its intrinsic viscosity was 3.1.

EXAMPLE 12

The polymer serving as a substratum was a commercial polystyrene prepared by the radical procedure. 10 g of this polystyrene were dispersed in 200 ml of heptane. To the suspension which was obtained were added 4 millimoles of diethyl zinc, 2 millimoles of cumene hydroperoxide, and 5 ml of acrylonitrile. The suspension was maintained at ambient temperature for 22 hours while stirring.

The product obtained was washed with methanol to which HCl had been added. Then it was subjected to several extractions with benzene in order to eliminate the homopolyacrylonitrile. By infra-red analysis, it was found that the copolymer obtained contained 20% by weight of acrylonitrile fixed on the polystyrene.

EXAMPLE 13

The polymer serving as substratum was a butyl rubber 600. 4 g of this rubber were dissolved in 100 ml of heptane and to the solution which was obtained were added 2 millimoles of diethyl zinc, 1 millimole of cumene hydroperoxide, and 2 g of acrylonitrile. The solution was stirred at ambient temperature for 17 hours. The solution was then precipitated in an excess of methanol and the product obtained was extracted several times with dimethyl formamide at 50°C to eliminate the homopolyacrylonitrile. The grafted polymer which was obtained contained 16% by weight of acrylonitrile.

EXAMPLE 14

Example 13 was repeated, using EPR (ethylene-propylenerubber) as the substratum. The grafted copolymer which was obtained contained 10% by weight of acrylonitrile.

EXAMPLE 15 (ethylene-propylene-rubber)

Example 1 was repeated with 12 millimoles of tributyl aluminum $Al(C_4H_9)_3$ in place of the diethyl zinc. In the product which was obtained, there was found to be 8.9% of methyl methacrylate fixed to the polyethylene, and the intrinsic viscosity in tetraline at 135°C. was 3.22.

EXAMPLE 16

In Example 1, the diethyl zinc was replaced by 14 millimoles of diethyl cadmium, $Cd(C_2H_5)_2$, the other conditions remaining the same. The content of methyl methacrylate fixed to the polyethylene was 9% and the characteristics of the product were practically the same as in Example 1.

EXAMPLE 17

The 3 millimoles of diethyl zinc in Example 9 were replaced by 5 millimoles of butyl lithium, $LiC_4H_9$. The polypropylene obtained contained 7.3% of dimethyl-amino ethyl methacrylate.

EXAMPLES 18 and 19

The grafting of the acrylonitrile on polystyrene according to Example 12 was repeated twice, with replacement of the diethyl zinc by: firstly (Example 18), 2 millimoles of dipropyl zinc and secondly (Example 19), 2 millimoles of diphenyl zinc. The respective contents of acrylonitrile in the copolymer which were obtained were 20.3% and 18.7%.

While it will be apparent that the illustrated embodiments of the invention herein disclosed are well calculated adequately to fulfill the objects and advantages primarily stated, it is to be understood that the invention is susceptible to variation, modification, and change within the spirit and scope of the subjoined claims.

The invention having been thus described, what is claimed as new and desired to secure by Letters Patent is:

1. An improvement in the process for forming graft copolymers of a polymer and a monomer which is polymerizable by free radicals, in which process the polymer, the monomer, an organometallic compound and a generator of free radicals are combined in an inert liquid medium and under an inert atmosphere, wherein the improvement comprises
   a. that the temperature of the components is maintained at −80°C to 60°C at all times during reaction, and
   b. that the organometallic compound is combined with the polymer before or at the same time as the organometallic compound is combined with the monomer.

2. An improved process as recited in claim 1, wherein the organometallic compound and the generator of free radicals are combined with the polymer before they are combined with the monomer.

3. A process as recited in claim 1, wherein the organometallic compound is a member chosen from the group consisting of an alkyl, cycloalkyl and aryl derivatives of a a metal with an atomic number in the range from 3 to 56.

4. A process as recited in claim 3, wherein the member is a metal alkyl containing 1 to 6 carbon atoms in each alkyl radical and wherein the metal is chosen from the group consisting of Li, Mg, Al, Zn, or Cd.

5. A process as recited in claim 1, wherein the organometallic compound is a $ZnR_2$ or $CdR_2$, and wherein the R is chosen from the group consisting of methyl, ethyl, propyl, and phenyl.

6. A process as recited in claim 1, wherein the generator of the free radicals is an oxidant selected from the group consisting of oxygen, air, organic hydroperoxides, peroxides, and peracids and esters thereof.

7. A process as recited in claim 6, wherein the organic hydroperoxide is selected from the group consisting of cumyl hydroperoxide and paramenthane hydroperoxide.

8. A process as recited in claim 1, wherein the generator of free radicals is a mixture of a first substance chosen from the group consisting of organo-zinc and organocadmium compound with a second substance chosen from the group consisting of a quinone and a phenol.

9. A process as recited in claim 1, wherein the mixture contains, per mole of monomer in the polymer being used, 1 to 30 millimoles of the organometallic compound and 1 to 30 millimoles of the free radical generator, the preferred relative proportion being from 0.5 to 4 equivalents of metal per radical which can be freed.

10. A process as recited in claim 1, wherein the polymer is selected from the group consisting of polyethylene, polypropylene, polystyrene, polybutadiene and ethylenepropylene-butadiene terpolymer, and wherein the polymerizable monomer to be grafted is vinyl acetate.

11. A process as recited in claim 1, wherein the polymer subjected to the grafting is a polyolefin.

12. A process as recited in claim 1, wherein the monomer to be grafted is selected from the group consisting of vinyl monomers.

* * * * *